Nov. 23, 1926.
F. W. ROHRS
1,607,915
ILLUMINATED LICENSE PLATE
Filed March 22, 1926    2 Sheets-Sheet 1
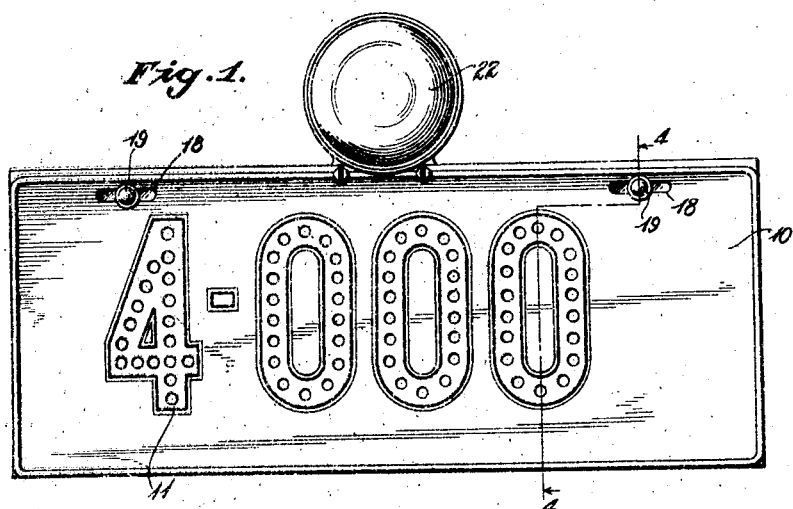
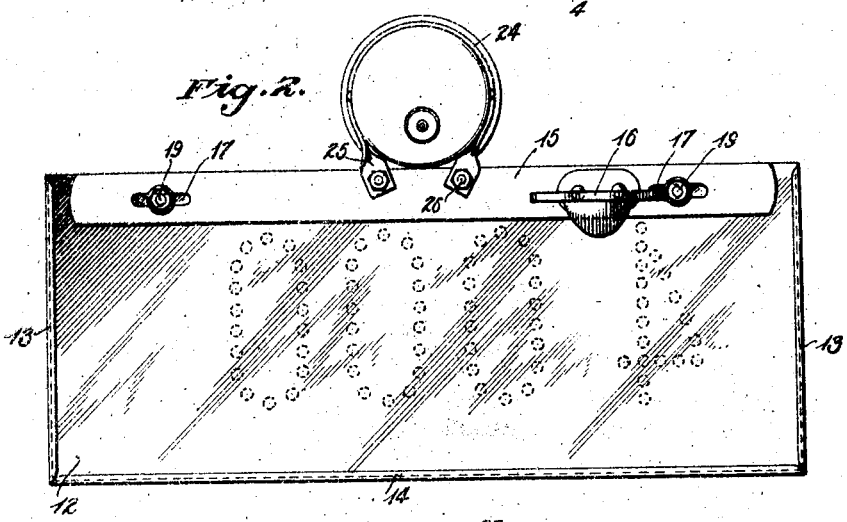
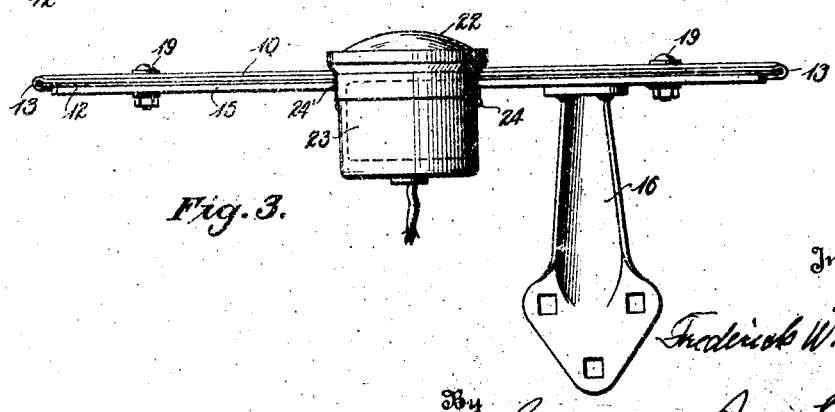
Inventor
Frederick W. Rohrs
By Cushman, Bryant & Darby
Attorneys

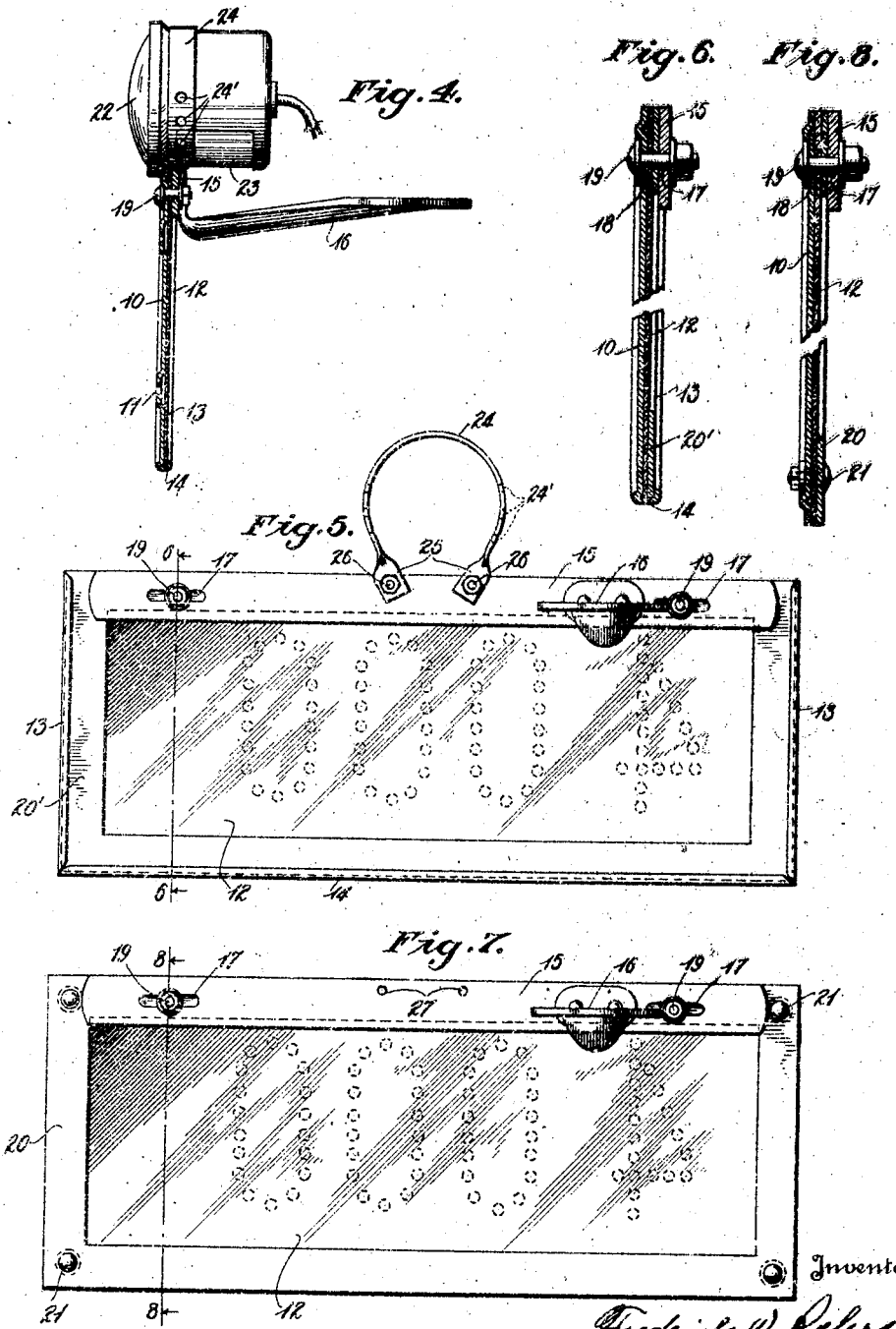

Patented Nov. 23, 1926.

1,607,915

UNITED STATES PATENT OFFICE.

FREDERICK W. ROHRS, OF BALTIMORE, MARYLAND.

ILLUMINATED LICENSE PLATE.

Application filed March 22, 1926. Serial No. 96,599.

My invention has as its principal purpose to render standard automobile license plates, as issued, clearly visible at night. I am aware that devices for this purpose have been suggested before but the means proposed have been of rather complicated or cumbersome nature and have never come into use to any large extent. Most of such devices require special plates and light boxes of special construction. The essence of my invention lies in the adaptation of standard plates for illumination, using the standard plate brackets and tail lights such as are of stock nature with all automobiles. The license plate will be perforated to outline the usual indicia and will preferably be provided with a colored backing sheet. The standard tail light will be so disposed relative to the license plate that instead of throwing a downward ray in front of the license plate, as is usual, this light will be thrown to the rear of the plate.

In the accompanying drawings:

Fig. 1 is a front view of a license plate and tail light in the adaptation according to my invention.

Fig. 2 is a rear view of Fig. 1 showing a common manner of attaching the backing sheet.

Fig. 3 is a top view of same.

Fig. 4 is a section on the line 4—4 of Fig. 1.

Fig. 5 shows the backing sheet in another manner of attachment.

Fig. 6 is a section on the line 6—6 of Fig. 5.

Fig. 7 shows the backing sheet in a third manner of attachment.

Fig. 8 is a section on the line 8—8 of Fig. 7.

Referring to the drawings 10 represents a standard license plate having the customary indicia outlined by means of perforations 11. In Figs. 2 and 3, 12 represents a backing sheet of colored translucent material and in actual practice I prefer to use non-friable material such as celluloid. One method of attaching the backing sheet is shown in Figs. 2 and 3 and it will be noted that here the lateral and bottom edges, 13 and 14 respectively, of the plate are bent backwardly and inwardly and these inturned edges serve to engage the margins of the backing sheet. Thus treated the license plate forms what might be termed an open faced envelope for receiving the translucent sheet.

The usual horizontal plate supporting arm is represented as 15 and this is carried in the usual manner by a body-attached bracket 16. Such arms are ordinarily provided with slots 17 coinciding with similar slots 18 of the license plate and the two members are connected by bolts 19. In carrying out my invention these bolts may or may not be omitted, as other means are provided for securing the two elements together.

In Figs. 7 and 8 I have shown an open frame 20 conforming to the margins of the license plate and being secured thereto by bolts 21. The margins of the transparent sheet 12 are securely grasped and held between the frame and the margins of the license plate.

Fig. 5 shows a method of securing the backing sheet to the license plate which constitutes a combination of the two methods above described. According to this embodiment, the edges of the license plate are inturned as in Figs. 2 and 3 and engage the extreme margins of the backing sheet. In order that the latter may be more firmly retained in position, however, a frame 20' similar to frame 20 of light metal is interposed between the sheet and the inturned edges.

Tail lights of usual design include a front window 22 and a bottom and somewhat laterally directed window 23. Customarily these lamps are attached to the plate supporting arm by means of a bracket attached to the rear of the lamp so that light from window 23 will be directed over the front face of the license plate. I propose to modify this structure by removing such attaching bracket and providing a clamping strip 24 surrounding the body of the lamp intermediate the two windows. This clamping strip 24 is attached at its extremities 25 by means of bolts 26 to the supporting arm 15 in such a manner that the plane of the license plate stands between the two windows. In this manner window 22 performs its usual function of casting a signal to the rear of the automobile, while window 23 instead of illuminating the front of the plate throws light to the rear thereof.

In assembling the units, if no backing sheet is to be used, the arm 15 is merely placed in coincidence with the top inner margin of the license plate and the ends 25 of the clamping strip 24 are arranged with their apertures in alignment with apertures 27 of arm 15 which in turn are in alignment with similar apertures formed in the license plate. Bolts 26 are now inserted and tightened and serve as a common means for uniting the units of the combination. In Figs. 2 and 3 the upper margin of the backing sheet is shown as engaged and held between the arm 15 and the plate, while in Figs. 5 to 8 the upper margin of this sheet is tightly engaged between the upper member of the frame and the plate, the frame member, of course, lying between the sheet and arm 15.

As shown in Figs. 4 and 5, the ends of strip 24 are provided with a number of holes 24'. Different sizes of lamp bodies may thus be accommodated by twisting the ends of the strip to bring the selected holes into a plane at right angles to the plane of the strip. Superfluous material beyond the points of fastening may be, of course, clipped off.

It will thus be seen that I have provided a simple and serviceable means for the adaptation of standard license plates for the purpose of illumination and while I have described some specific aspects of my invention, it is to be understood that the scope thereof is to be determined in accordance with the terms of the following claims.

I claim:

1. In combination with an automobile license plate, said plate having indicia outlined thereon by means of perforations, a lamp adapted to illumine the rear of the plate, a mounting element for said lamp having an attachment lug, a common arm for supporting said plate and lamp, and common attachment means for detachably securing said plate and said lug to said arm.

2. In combination with an automobile license plate, said plate having indicia outlined thereon by means of perforations, a translucent sheet secured directly to said plate at its rear, a lamp for supplying illumination to the rear of said sheet, a mounting element for said lamp having an attachment lug, a common arm for supporting said plate and lamp and common attachment means for detachably securing said plate and said lug through said sheet to said arm.

3. In combination with an automobile license plate, said plate having indicia outlined thereon by means of perforations and having its side and bottom edges turned backwardly and inwardly, a translucent sheet retained at the rear of said plate by said inturned edges, a horizontal supporting arm coinciding with the top inner margin of said plate, means uniting said arm and plate through said sheet, and a lamp supported on said arm and adapted to supply illumination at the rear of said sheet.

4. In combination with an automobile license plate, said plate having indicia outlined thereon by means of perforations and having its side and bottom edges turned backwardly, a translucent sheet retained at the rear of said plate by said inturned edges, a horizontal supporting arm coinciding with the top inner margin of said plate, means uniting said arm and plate through said sheet, and a lamp secured to said arm by said uniting means and adapted to supply illumination at the rear of said sheet.

5. In combination with an automobile license plate, said plate having indicia outlined thereon by means of perforations and having its side and bottom edges turned inwardly and backwardly, a translucent sheet at the rear of said plate and having its respective margins engaged by said inturned edges, a frame member having its respective margins engaged between said inturned edges and said sheet, means for supporting said plate, and means for supplying illumination at the rear thereof.

6. In combination with an automobile license plate, said plate having indicia outlined thereon by means of perforations, a lamp having front and bottom windows, means for supporting said plate and lamp whereby the front window of the latter is in advance of the front face of said plate and said bottom window is adapted to supply illumination to the rear of said plate, and common attaching means for securing said plate and lamp to said supporting means.

7. In combination with an automobile license plate, said plate having indicia outlined thereon by means of perforations, and a lamp having front and bottom windows, a horizontal supporting arm coinciding with the upper margins of said plate, a clamping strip surrounding said lamp intermediate said windows, and common means for securing said plate and ends of said strip to said arm.

8. In combination with a supporting arm, an automobile license plate secured thereto, said plate having indicia outlined thereon by means of perforations, a lamp adapted to throw light to either side of the plate, a strip surrounding the body of the lamp, said strip having a plurality of longitudinally spaced holes near its ends, and means for securing said strip to said arm through holes brought into a plane at right angles to the plane of the strip by twisting the ends of the latter.

In testimony whereof I have hereunto set my hand.

FREDERICK W. ROHRS.